United States Patent
Yang

(10) Patent No.: US 8,451,737 B2
(45) Date of Patent: May 28, 2013

(54) METHOD FOR PROCESSING INFORMATION REPORTING, INFORMATION REPORTING DEVICE AND SYSTEM

(75) Inventor: Zhenting Yang, Shenzhen (CN)

(73) Assignee: Huawei Technologies, Co., Ltd., Shenzhen (CN)

(*) Notice: Subject to any disclaimer, the term of this patent is extended or adjusted under 35 U.S.C. 154(b) by 612 days.

(21) Appl. No.: 12/120,610

(22) Filed: May 14, 2008

(65) Prior Publication Data

US 2008/0285465 A1 Nov. 20, 2008

(30) Foreign Application Priority Data

May 14, 2007 (CN) .......................... 2007 1 0106225

(51) Int. Cl.
*G01R 31/08* (2006.01)
*G06F 11/00* (2006.01)

(52) U.S. Cl.
USPC ........................................................ 370/241

(58) Field of Classification Search
USPC ........................................................ 370/241
See application file for complete search history.

(56) References Cited

U.S. PATENT DOCUMENTS

| | | | | |
|---|---|---|---|---|
| 5,923,247 | A * | 7/1999 | Dowden et al. ............... | 340/506 |
| 6,405,250 | B1 | 6/2002 | Lin et al. | |
| 6,578,076 | B1 * | 6/2003 | Putzolu ......................... | 709/223 |
| 6,671,254 | B1 * | 12/2003 | Nakahira ....................... | 370/229 |
| 6,792,456 | B1 * | 9/2004 | Hellerstein et al. ........... | 709/224 |
| 7,353,269 | B2 * | 4/2008 | Aki et al. ....................... | 709/224 |
| 2002/0083169 | A1 | 6/2002 | Aki et al. | |
| 2003/0065816 | A1 * | 4/2003 | Dharmadhikari et al. .... | 709/240 |
| 2003/0208572 | A1 | 11/2003 | Shah et al. | |
| 2005/0152370 | A1 | 7/2005 | Meehan et al. | |
| 2006/0093143 | A1 * | 5/2006 | Maeda et al. .................. | 380/256 |

FOREIGN PATENT DOCUMENTS

| | | |
|---|---|---|
| CN | 1901392 A | 1/2007 |
| CN | 1941715 A | 4/2007 |
| EP | 1703394-2 | 9/2006 |
| WO | WO 2007036150 A1 * | 4/2007 |
| WO | WO-2008138196 A1 | 11/2008 |

OTHER PUBLICATIONS

Translation of WO 2007036150 A1, Apr. 2007, WIPO, Oyang Weilong, p. 1-15.*
Derwent Publication CN 1901392 A , Jan. 2007, Huawei technologies CO LT.*
S.Ooghe et al. , Network working group, internet-draft, Jan. 2006, entire document, XP-002602174.*
S.Ooghe et al. , framework and requirements for a Layer 2 Control Protocol (L2CP) in broadband Multi-service Networks, Network working group, Jan. 2006, all pages.*

(Continued)

*Primary Examiner* — Mark Rinehart
*Assistant Examiner* — Maharishi Khirodhar
(74) *Attorney, Agent, or Firm* — Slater & Matsil, L.L.P.

(57) ABSTRACT

A method for processing information reporting, including: obtaining event information when an REFE detects an event; and processing reporting of event information according to a control policy. An information reporting device, which is configured with: an event detecting unit, adapted to detect an event; a policy controlling unit, adapted to obtain a control policy corresponding to the event, and instruct a reporting processing unit to perform processing according to the control policy; and a reporting processing unit, adapted to generate and send the information report.

20 Claims, 4 Drawing Sheets

OTHER PUBLICATIONS

Sanjay Wadhwa, Protocol for access Node Control Mechanism in broadband networks, Feb. 25, 2007, IETF, entire document.*
S.Ooghe et al., framework and requirements for a Layer 2 Control Protocol (L2CP) in broadband Multi-service Networks, Network working group, Jan. 2006, all pages.*
Sanjay Wadhwa, Protocol for access Node Control Mechanism in broadband networks, Feb. 25, 2007, IETF, entire document.*
First Chinese Office Action regarding Application No. 200710106225.5, mailed Dec. 27, 2010. Partial translation provided by Huawei Technologies Co., Ltd.
Written Opinion of the International Searching Authority regarding Application No. PCT/CN2007/071166, mailed Mar. 27, 2008. Translation provided by Huawei Technologies Co., Ltd.
Ooghe et al. Framework and Requirements for a Layer 2 Control Protocol (L2CP) in Broadband Multi-Service Networks- draft-ooghe-framework-00.txt. Jan. 2006. XP-002602174.
Moisand et al. Protocol for Access Node Control Mechanism in Broadband Networks. draft-ietf-ancp-protocol.00.txt. Feb. 25, 2007.
Extended European Search Report regarding Application No. 07817356.4-1244, dated Oct. 15, 2010.

* cited by examiner

METHOD FOR PROCESSING INFORMATION REPORTING, INFORMATION REPORTING DEVICE AND SYSTEM

CROSS-REFERENCE TO RELATED APPLICATIONS

This application claims the benefit Chinese Application No. 200710106225.5, filed May 24, 2007. The disclosure of the above application is incorporated herein by reference.

FIELD

The present disclosure relates to the technical field of communications, and in particular, to a method for processing information reporting and an information reporting device.

BACKGROUND

The statements in this section merely provide background information related to the present disclosure and may not constitute prior art.

The Layer 2 Control Mechanism (L2CM) or the Access Node Control Protocol (ANCP) is an access control mechanism or protocol for the next generation access network. Referring to FIG. 1, there are two function entities on two ends opposite to each other in L2CM or ANCP. One end is a Controller Function Entity (CFE) 5, and the other end is a Reporting and/or Enforcement Function Entity (REFE) 3. Network Access Server (NAS) device such as Broadband Network Gateway (BNG), Broadband Remote Access Server (BRAS) or IP edge device generally acts as the CFE, and a controller function of L2CM or ANCP is integrated in such a NAS device. An Access Node (AN) device generally acts as the REFE, and a reporting and/or enforcement function of the L2CM or ANCP is integrated in the AN.

In above systems, the NAS device, which is the CFE 5, controls and manages the AN that is the REFE through L2CM or ANCP, so as to perform function operations such as parameter configuration. The REFE 3 responses to a control request of the above NAS device, and reports event information actively, where the event information mainly includes status information of the REFE and enforcement feedback information as well as control decision information. The status information of the REFE refers to the topology change information of REFE, such as event information of the status change of a port or a line, where the bandwidth parameter of the port or line is included. The enforcement feedback information refers to the record information of the control or enforcement performed by the REFE, such as multicast accounting information or access statistical information. The control decision information refers to the parameters that are reported to the CFE by the REFE and are sent to request the CFE to enforce the service control decision, such as a multicast authorized parameter or admission control parameter.

A status information report of the REFE includes an access line status information report, i.e., when the AN detects that the status or rate of a line is changed, for example, when the rate of the Digital Subscriber Line (DSL) is changed, the AN should inform the NAS device of the status change event information of such lines actively according to the regulation of L2CM or ANCP. Then the NAS device adjusts or changes the Quality of Service (QoS) configuration parameters of the subscriber dynamically according to the status change event information of the line reported by the AN. Generally, under a NAS device, large amount of access lines may be included. Furthermore, because of the line characteristics of the DSL and the characteristics of the subscriber access line, situations such as rate variation, snap off or re-synchronization may easily occur in the DSL due to the influence of the environment. When the AN reports a lot of status change event information, it will be inevitably induced that the NAS is overloaded. Thus, problems such as denial of service may occur in the NAS.

The status information of the REFE further includes enforcement feedback information. Specifically, the REFE 3 may report the enforcement feedback information to the CFE 5. For example, the REFE 3 reports the multicast accounting information or access statistical information to the CFE 5. Generally, the REFE 3 includes large amount of subscribers or services and may generate a lot of enforcement feedback information. Therefore, the enforcement feedback information reported by the REFE 3 may also affect the performance of the network and devices such as the CFE 5, or may even cause problem because of the overload of the device.

When implementing the present disclosure, it is found by the inventor that in the prior art, at least the following problem exists with the information reporting mechanism in L2CM or ANCP: when the AN sends large amount of information reports, these information reports may cause an impact on the NAS and policy server, and may further cause the problem such as denial of service in the NAS.

SUMMARY

An aspect of the present disclosure is to provide a method for processing information reporting. In an L2CM or ANCP mechanism, the event information reporting may be effectively controlled, so that an impact on the NAS and policy server may be avoided, the load brought to the NAS and policy server due to reporting of large amount of information may be reduced or eliminated, and the stabilization of the network system may be assured.

Another aspect of the present disclosure is to provide an information reporting device. In the L2CM or ANCP mechanism, this device can effectively control the event information reporting, so that an impact on the NAS and policy server may be avoided, the load brought to the NAS and policy server due to large amount of information may be reduced or eliminated, and the stabilization of the network system may be assured.

An embodiment of the disclosure provides a method for processing information reporting, including:

obtaining event information when an REFE detects an event; and reporting the event information according to a control policy.

With the above technical solution, when implementing the L2CM or ANCP mechanism, the number of the event information report can be effectively controlled, so that the impact on the NAS and policy server due to large amount of event information may be avoided, the overload brought to the NAS and policy server due to large amount of event information may be reduced or eliminated, and a stable operation of the network system may be assured.

An embodiment of the disclosure provides an information reporting device, including:

an event detecting unit, adapted to detect an event;

a policy controlling unit, adapted to obtain a control policy corresponding to the event, and instruct a reporting processing unit to process according to the control policy; and a reporting processing unit, adapted to report event information according to the instruction of the policy controlling unit.

The device according to the embodiment may effectively control the number of the event information report sent by a reporting enforcement function entity device in the access network through the interaction among the event detecting unit, policy controlling unit and reporting processing unit in the L2CM or ANCP mechanism, large amount of event information may be suppressed, so that the impact on the NAS and policy server due to large amount of event information may be avoided, the overload brought to the NAS and policy server due to large amount of information may be reduced or eliminated, and a stable operation of the DSL access network system may be assured.

Hereinafter, the contents of the present disclosure will be further described with specific embodiments.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
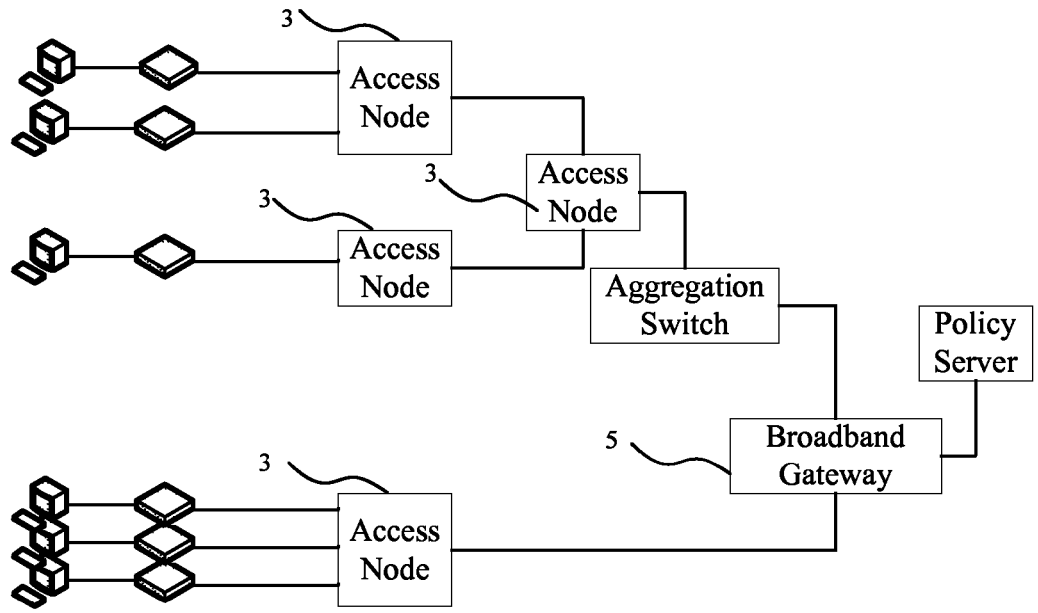
FIG. 1 is a schematic diagram showing an NGN network in the prior art.

The following description is merely exemplary in nature and is not intended to limit the present disclosure, application, or uses.

In an access network that is controlled based on ANCP/L2CM, an information report of the REFE includes a status information report of the REFE, an enforcement feedback information report, and a control decision information report, etc. The status information report is mainly the report of the status of a port or a line to the CFE from REFE. The enforcement feedback information report is mainly the report of record of the service enforcement or subscriber control from the REFE, where the enforcement feed back information report includes report of accounting record and access statistical, etc. The accounting record includes multicast accounting information, i.e., the record about joining of a multicast member (subscriber) or leaving of a multicast member. The control decision information report is mainly the report of parameters of the service control decision to the CFE from the REFE. The control decision information report, such as a multicast authorization requesting report or a control admission requesting report, is sent to request the CFE to enforce the service control decision. The above information reports are all triggered by events. For example, the status information report is triggered by the topology change event of the REFE, the enforcement feedback information report is triggered by the service track change event for performing control by the REFE, and the control decision information report is triggered by the service decision demand event for requesting control decision policy by the REFE. Specifically, the topology change events for triggering a line status information report may further include: 1. line activation (Up or Active); 2. line re-synchronization; 3. line deactivation (Down or De-active), etc. When these events occur, the AN device needs to report the event information to the NAS device. The object is to make the NAS or policy server that obtains the event information perform processing according to such information in time, so that the QoS provided for the subscriber may be assured, and differentiated services may be provided for the subscriber.

Practically, such events may occur on a line where no accessed subscriber exists. Some events may occur several times before a subscriber accesses the network via the line. Some events may not affect the subscriber who accesses the network via this line. Therefore, there are a plurality of events not to be known by the NAS or policy server, such as the event about the event occurred before the subscriber accesses the network via the line. Thus, in the embodiments of the disclosure, necessary measures are taken to suppress the reporting of the event information, so that the messages for reporting event information may be reduced. The processing overload of the NAS or policy server may be prevented, and the problem of denial of service induced may be avoided.

Therefore, the following method may be employed to control the event information reporting: when detecting an event to be reported, the REFE in the access network matches the event with the control policy of the event information, and processes the information reporting according to the corresponding control policy. The REFE in the access network may be an Access Node (AN), a Digital Subscriber Line Access Multiplexer (DSLAM), etc. The event may be line activation, line synchronization, line deactivation, multicast member joining, multicast member leaving, etc.

The control policy of the information reporting may be pre-configured. For example, the control policy may be defined according to the requirements of the operator. When the control policy is defined, the control policy is saved in a policy database. For example, the control policy may be saved in a policy server. The control policy may be configured on REFE via a network management system or L2CM. The control policy may be configured flexibly. A policy may be configured for one or more events of a port, or a policy may be configured for one or more events of a whole AN or AN partition.

Figure 2:
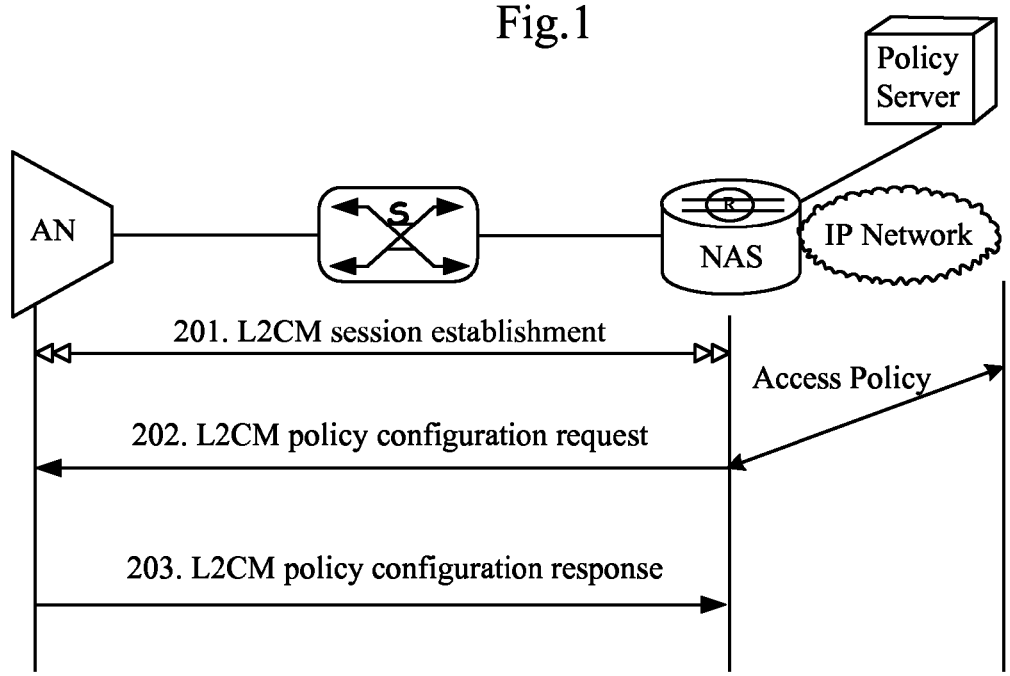
FIG. 2 is a schematic flow chart for configuring a control policy according to an embodiment of the disclosure.

FIG. 2 shows a flow chart for configuring the control policy via L2CM or ANCP. In FIG. 2, AN acts as the REFE, and NAS acts as the report CFE. The flow chart includes:

Process 201: The REFE and the CFE establish a connection of L2CM or ANCP, the connection is adapted to carry report message containing event information or configuration message containing control parameters.

Process 202: The CFE sends a policy configuration request message to the REFE, where the policy configuration request message includes a control policy, the control policy may be obtained from the policy server by the report CFE, or may be sent by the policy server to the report CFE.

Process 203: The REFE configures the control policy and responds to the policy configuration request message.

The control policy is described with a general policy format, such as: performing a corresponding processing when an event occurs and the condition is satisfied. The control policy may be described with the Extensible Markup Language (XML) or plain text, and the control policy is saved in the policy server. The policy server configures the control policy on the REFE via a network management system or L2CM. For example, the policy server resolves and extracts—such as from the XML—policy parameters of the control policy such as event ID, condition parameter and processing instruction, and then configures the control policy to the REFE via the network management system or L2CM. The REFE configures the control policy. The specific implementation of the control policy may be a control threshold of the event a control interval of the event, a limit rate of the event (such as frequency parameter, i.e., how many times the event is to be reported during a predefined period), a delay time of the event, an enabling flag of the event, a reporting mode of the event and a consecutive time of the event, etc. Furthermore, the control policy may also be an Access Control List (ACL).

Figure 3:
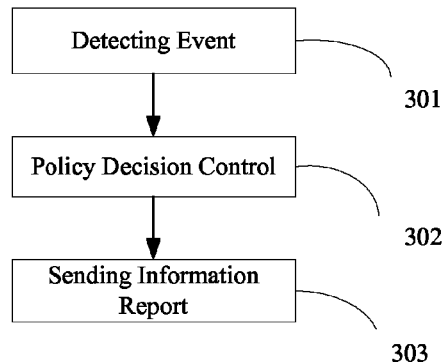
FIG. 3 is a schematic flow chart for controlling an information reporting according to a policy in the disclosure.

Please refer to FIG. 3, the procedure of processing information reporting according to the policy by the REFE is as follows:

Process 301: detecting an event and obtaining event information by the REFE.

The detecting method includes snooping or detection of events. The events detected include a topology change event of the REFE, a service track change event, or a service decision demand event. For example, the topology change event includes: line activation, line deactivation, line re-synchronization etc., or service decision demand event includes: a subscriber accesses the network or a multicast member joins, etc. The protocol for detection of subscriber accessing the network at least includes: the Point to Point Protocol (PPP), the Dynamic Host Configuration Protocol (DHCP), 802.1x, Protocol for Carrying Authentication for Network Access (PANA). The information of the event obtained by the REFE may include: line topology attributes (i.e., line bandwidth, line delay, line status, line interleaving depth and line error rate); subscriber subscription information (i.e., the available line bandwidth subscribed by the subscriber); the line ID; the multicast address; subscriber ID; the time when the event occurs or the time when the event of the same type occurred last time. Here the subscriber ID includes the address of the subscriber or the ID of the port to which the subscriber is connected. Generally, the type of the event is known by the REFE.

Process 302: Policy decision control. According to the event detected, the REFE obtains the control policy of this event, and obtains the processing instruction according to the control policy. The processing instruction includes the operation such as sending an information report, sending the information report with a time delay, not sending the information report, buffering the information report, etc. When the event is detected, the REFE obtains the information of the event, matches the control policy with the event, and extracts the processing instruction according to the control policy. The REFE may obtain the control policy with the following method, i.e., searching for the corresponding control policy with the line ID and the activation event type of a line activation event. If the control policy is saved in the form of a flag variable, the process of searching for the control policy of the event with the information such as the event type refers to obtaining the corresponding flag variable according to this event. Generally, the flag variable implicitly includes the processing instruction. For example, a limit rate variable (EventReportNumPerMin: 3) is set in the device, and here the control condition and the processing instruction are implicitly included. If the control policy is saved in the form of ACL, the process of searching for the control policy of the event with the information such as the event type refers to obtaining the corresponding ACL according to the event. The REFE performs policy decision control based on the control policy. The policy decision control specifically includes the following: when the control policy is a control threshold of the event, the event information is compared with a preconfigured threshold value of the event, and if the event information reaches (or exceeds) the preconfigured threshold value of the event, the information report of the event is sent or not sent; when the control policy is a control interval of the event, a matching is performed between the time interval of the events and a preconfigured control time interval of the event, and if the time interval between the event and a last event does not reach the preconfigured time interval of the event, no information report of the event is sent; when the control policy is the limit rate of the event, a matching is performed between the event occurrence rate and a preconfigured limit rate of the event, and if the event occurrence rate exceeds the preconfigured limit rate of the event, no information report of the event is sent.

Process 303: sending the information report, i.e., performing reporting according to the event information by the REFE. The REFE performs processing with respect to the report of the event information based on the control policy of the event information reporting, where the processing includes: sending an information report, sending the information report at a fixed time, sending the information report in response to a status querying request, and omitting the information report of the event. Sending the information report at a fixed time may be regarded as a special mode of sending the information report with a time delay, i.e., if in Process 302, the control policy is sent with a time delay, the REFE buffers the event information, and sets the time to be waited for sending according to the time delay parameter in the control policy. A timer may be initiated. When the timer expires, the information report is sent. Before sending the information report, the REFE fills or encapsulates the event information into an event information report message. Sending the information report in response to the status querying request refers to that when detecting the event information, the REFE buffers the event information according to the policy, and responds to the event information querying request of the report CFE. The event information reporting is performed with the response to the event information querying request message of the report CFE. Furthermore, the information report may be sent with a group events mode, i.e., information of a plurality of ports or event information may be sent in one report message. The above information report message may be a message based on L2CM or ANCP.

The specific implementation of the above technical schemes will be further illustrated with the following embodiments.

The line parameters for activation or re-synchronization of the DSL are generally negotiated according to the line profile of the DSL that is configured for the line. Thus, a normal line needs to be configured with the line profile of the DSL. The line profile is adapted to control the line parameters. The line profile of the DSL may be configured via network management system (NMS) or L2CM, and may be optimally configured according to the capability that can be provided by the line. In other words, an optimal line profile is configured, so that the line may provide the best performance.

EMBODIMENT I

Figure 4:
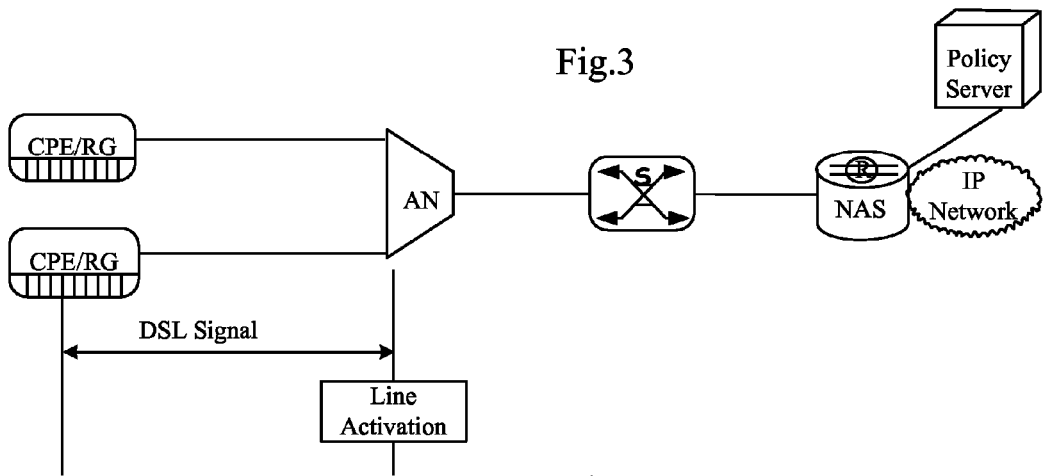
FIG. 4 is a schematic diagram showing the exchange of device information during the event detection in the disclosure.

Please refer to FIG. 4, which is a schematic flow chart for processing a line activation event according to an embodiment of the disclosure. When a subscriber line is activated, for example, when the DSL enters an active status, no information report may be sent with respect to the event information during the activation of the subscriber line, so as to reduce redundant information. Because during the activation of the line, no subscriber accesses the network, so the NAS or policy server may not need to know the event information of subscriber line activation. In order to be able to suppress the status event information during the activation of the subscriber line, it may be defined in the above control policy that if the condition corresponding to the subscriber line activation event is True, the action is Ignore. In a specific implementation of this control policy, the enabling flag of the line activation event information may be configured as Forbidden. The enabling flag of the line activation event information may be implemented according to the designated AN or AN partition or the designated line of AN. When detecting the event of the subscriber line activation, the AN does not report the subscriber line activation event information according to the control policy corresponding to this event.

Figure 5:
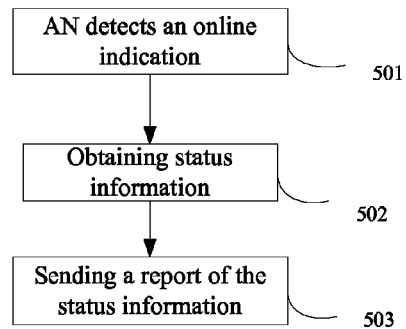
FIG. 5 is a schematic flow chart of the embodiment shown in FIG. 4.

The line activation event may also be reported with a time delay or with a designated reporting mode. The number of messages may be reduced through the reporting with a time delay or the designated reporting mode. The control policy may be described as follows: "when the line activation event occurs, if an online indication is detected, the event information is reported". In a specific implementation of this control policy, the delay time or the reporting mode of the event information of the designated AN or AN partition or the line of AN may be configured. Please refer to FIG. 5 for detailed processes:

Process 501: The REFE detects the line activation event, obtains the event information, where the event information includes the line ID where the line activation event occurs, etc. The REFE obtains the control policy corresponding to the line activation event. For example, when the reporting mode for the line event information of the REFE is DHCP or Point-to-Point Protocol over Ethernet (PPPoE), the reporting of such event information is processed with a time delay. The REFE may perform snooping or detection of the online indication through configuring the ACL.

Process 502: The REFE detects the online indication, and starts to process the line activation event information reporting. The online indication may be a data flow that is monitored on a designated line (for example, there is a packet from the subscriber), or an Address Resolution Protocol (ARP) message packet, an DHCP message packet, an IP packet or a PPP message packet, etc. sent by the subscriber that is detected.

Process 503: The REFE obtains the event information. Specifically, when detecting the online indication on the designated line (or port), the REFE obtains the attributes such as line status. The attributes of the line include line ID (or address), line bandwidth, status, line interleaving depth, etc.

Process 504: The REFE sends the status information packet. The REFE may process the reporting of the event information according to the report mode of the event information. For example, if the reporting mode of the event information is DHCP, the line attribute information is filled as the DHCP option into a DHCP message, and then the DHCP message is sent; if the reporting mode of the event information is PPP, the line attribute information is filled as an option into a PPP message, and then the PPP message is sent; or if the reporting mode of the event information is none of the above modes, the sending is performed according to the default L2CM message. The REFE obtains the corresponding L2CM connection according to the line ID, encapsulates the line attributes into an L2CM report message, and sends the L2CM report message.

Then the REFE stops detecting the online indication. For example, the REFE deletes the ACL configuration for detecting the online indication, or makes the ALC configuration for detecting the online indication sleep.

EMBODIMENT II

Figure 6:
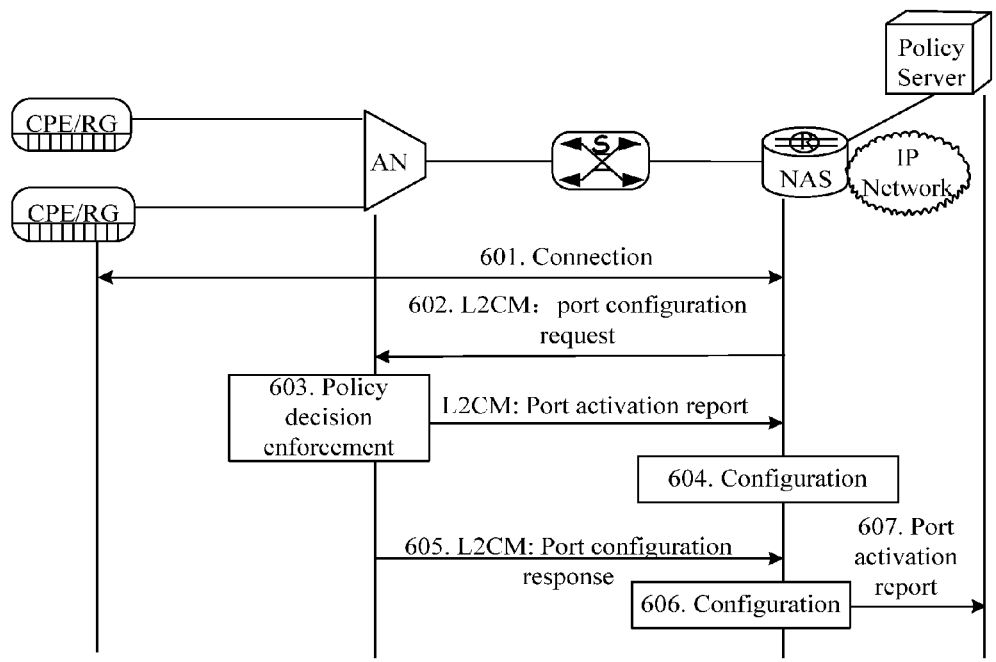
FIG. 6 is a schematic diagram showing the exchange of device information in an embodiment of controlling the information reporting according to the policy.

Referring to FIG. 6, in this embodiment, another method for reporting the line activation event with a time delay is described. The method mainly includes the following processes:

Process 601: A subscriber accesses the network via an AN and a NAS. For example, a subscriber terminal accesses the network with the PPP protocol, IP session protocol, 802.1x or DHCP protocol, etc.

Process 602: The NAS sends to the AN a request for configuring the subscriber subscription information, such as a request for the line bandwidth subscribed by the subscriber. In the present embodiment, the request is an L2CM configuration request message.

Process 603: The policy decision is enforced, i.e., the AN detects the event of subscriber accessing the network. When the request for configuring the subscriber subscription information is received, the AN obtains the subscriber subscription information, performs matching with a preconfigured control policy of the event, checks the condition of the control policy (such as the threshold), and processes the information reporting. When it is needed to report, an information report is sent. In the present embodiment, the information report is an information report message of L2CM or ANCP. The control policy in the present embodiment may be described as follows: "when the event that a subscriber accesses the network occurs, if the line parameters do not satisfy the subscriber subscription information, the event information is reported". For example, assuming that in the subscriber subscription information, the downlink bandwidth is 8M, and the downlink rate of the line is smaller than 8M, then the AN should report the actual line parameters at present. If the actual status of the current line satisfies the requirements of the subscriber subscription information, for example, if the downlink rate of the line is larger than 8M, the DSLAM does not report the corresponding status event information.

After executing the above operations, there are also following operation processes with respect to the NAS:

Process 604: When receiving the information report message sent by the AN, the NAS configures parameters such as QoS according to the parameters in the message.

Process 605: After configuring the subscriber subscription information, the AN sends a response to the request for configuring the subscriber subscription information sent by the NAS. In the present embodiment, the response is an L2CM configuration response message.

Process 606: If the information report of the AN in Process 603 is not received, the NAS configures the parameters such as QoS according to the subscriber subscription information.

If the information report of the AN in Process 603 is received by the NAS, no operation is performed in the current process.

Process 607: The NAS sends parameters required for the line Admission Control (AC), such as bandwidth, to the policy server via a port activation report message.

In a practical situation, if the control policy that "when the event that a subscriber accesses the network occurs, if the line parameters do not satisfy the subscriber subscription profile, the event information is reported" is set, the situation of reporting the status event information in the above Process 603 and Process 604 may rarely occur. Thus, the report messages can be reduced greatly, so that the processing load of the devices such as NAS may be lightened.

In the present embodiment, Processes 602 and 605 are not essential processes. The AN may detect the event that a subscriber accesses the network through intercepting PPP message, 802.1x message or DHCP message etc.

In the present embodiment, when it is detected in Process 603 that the information report needs to be sent, the information report message may also not be sent. The report information parameters may be sent via the response message in Process 605. Thus, in Process 606, parameters such as QoS may be configured according to the status event information in the response message in Process 605, so that the number of messages processed by the NAS etc. may be further reduced.

EMBODIMENT III

When a re-synchronization event occurs on the line, the line parameters may be changed. However, not all the changes may affect the QoS for the subscriber. Therefore, a control threshold for the event information may be configured on the line. The line re-synchronization event information reporting may be controlled with the threshold. If the change value of the line attribute after re-synchronization exceeds the threshold value, the event report may be sent or not be sent. The threshold may be configured according to the line attribute. For example, the line bandwidth threshold, line interleaving depth threshold, line transfer time delay threshold or line packet loss rate threshold may be configured, or one or more combinations of the above thresholds may be configured. The REFE compares the change amplitude of the line attribute after line re-synchronization with the threshold, and processes the information reporting according to the comparison result. For example, if the change amplitude of the line bandwidth is smaller than the threshold bandwidth, no synchronization event information report is sent; otherwise, the synchronization event information report is sent.

Figure 7:
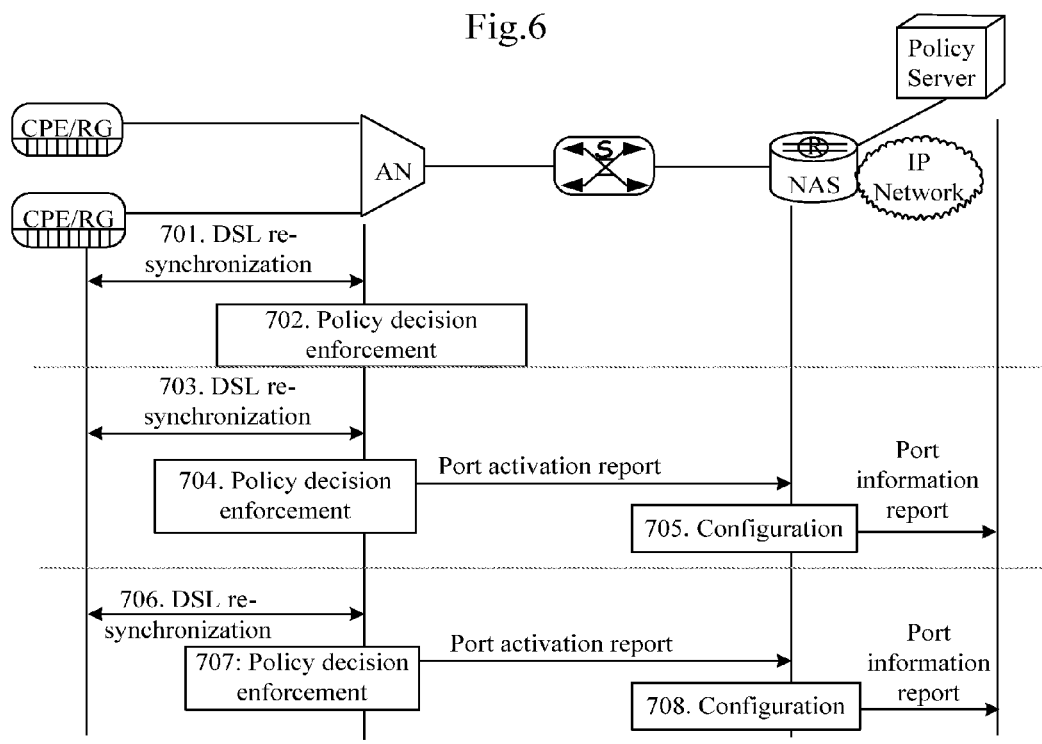
FIG. 7 is a schematic diagram showing the exchange of device information in another embodiment of controlling the information reporting according to the policy.

Please refer to FIG. 7, which is a flow chart of the policy control processing for the line re-synchronization event according to an embodiment of the disclosure. The control policy defined is as follows: "when the line synchronization event occurs, if the line parameter before synchronization or after synchronization does not satisfy the subscriber subscription, the event information is reported". In the present embodiment, the subscriber subscription acts as the control threshold of the event.

For example, it is assumed that the line bandwidth in the subscriber subscription is 8M.

Process 701: A re-synchronization event occurs on the line, and the subscriber line bandwidth is updated to 8.1M.

Process 702: The policy decision is enforced. In other words, according to the condition of the control policy, the line parameter before synchronization or after synchronization satisfies the subscriber subscription (8.1M>8M), the event information does not need to be reported, and the corresponding information report is not sent. If the control threshold configured for the event information is a change amplitude of 0.5M, and the change amplitude of line bandwidth (0.1) after synchronization is smaller than 0.5M, this event information does not need to be reported, and the corresponding information report is not sent.

Process 703: The re-synchronization occurs on the line, and the bandwidth is updated to 7M.

Process 704: The policy decision is enforced. In other words, according to the condition of the control policy the line parameter before synchronization or after synchronization does not satisfy the subscriber subscription profile (7M<8M), the event information needs to be reported. The AN reports the event information via a port activation report message, and the line parameter after synchronization is contained in the event information.

Process 705: When receiving the message sent by the AN, the NAS configures parameters such as QoS according to the parameter in the message. If there exits a policy server at the same time, the NAS sends the information report after synchronization to the policy server. In the present embodiment, the information report is a port information report.

Process 706: A re-synchronization occurs on the line, and the bandwidth is updated to 8.5M.

Process 707: The policy decision is enforced. In other words, according to the condition of the control policy, the event information needs to be reported. The AN reports the event information via a port activation report message, and the line parameter after synchronization is contained in the event information report message.

Process 708: When receiving the message sent by the AN, the NAS configures parameters such as QoS according to the parameter in the message. If there exits a policy server at the same time, the NAS sends a line parameter information report after synchronization to the policy server. In the present embodiment, the line parameter information report is a port information report.

In a word, when the line is re-synchronized, the event information that affects the QoS of the subscriber may be generated, or the event information that does not affect the QoS of the subscriber may be generated. With the technical solution according to the embodiment of the disclosure, the status event information that does not need to be reported may be filtered, so that the impact on the NAS caused by the unnecessary status event information report may be reduced.

EMBODIMENT IV

When the line deactivation event occurs, for example, when the DSL enters an idle status or a silent status, it may be avoided to report large amount of event information with the solution according to the embodiment of the disclosure as described hereinafter, so that the situation that the subscriber generates large amount of status event information reports may be prevented.

Figure 8:
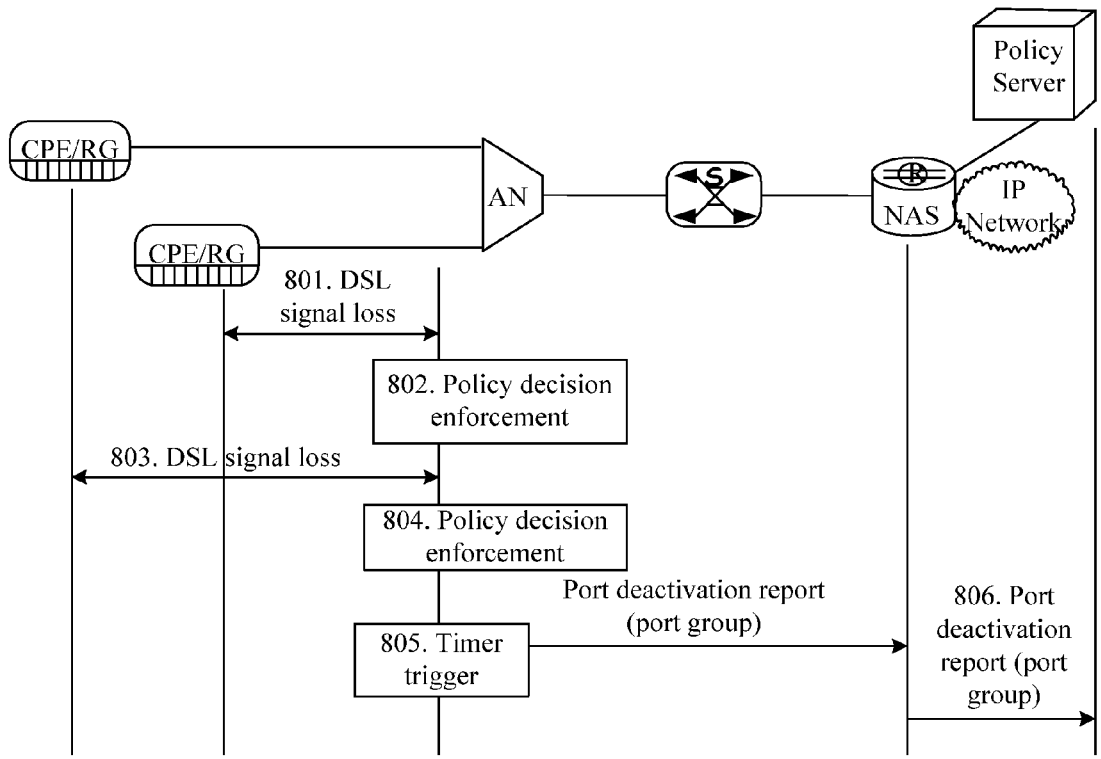
FIG. 8 is a schematic diagram showing the exchange of device information in still another embodiment of controlling the information reporting according to the policy.

Please refer to FIG. 8, which is a flow chart of the policy control processing for the line deactivation event according to the disclosure. The control policy defined may be as follows: "when the line deactivation event occurs, if there is a subscriber online (if the number of the subscriber online is larger than 0), the reporting is performed with a time delay of 5 minutes". The specific implementation of this control policy includes the time delay parameter and/or the threshold of the online subscriber number configured for sending the line deactivation information on the designated AN or AN partition or the line of AN.

Process 801: The signal on the first line is lost. For example, the DSL enters the idle status or silent status, i.e., a deactivation event occurs.

Process 802: When detecting the deactivation event, the AN reports the event information after a time delay of 5 minutes according to the policy information. In other words, the AN buffers the event information, and then sets a timer of 5 minutes. When the timer expires, it is triggered to send the event information report.

Process 803: The signal on the second line is lost, i.e., the deactivation event occurs.

Process 804: When detecting the deactivation event, the AN reports the event information after a time delay of 5 minutes according to the policy information. In other words, the AN buffers the event information, and then sets a timer of 5 minutes. When the timer expires, it is triggered to send the event information.

Process 805: When the time delay of 5 minutes expires, the AN reports the event information with a port deactivation report message.

Process 806: When receiving the message sent by the AN, the NAS sends the port deactivation report message to the policy server.

In order to reduce the number of the messages sent, in Process 805, the AN may report in a group event mode, i.e., the AN may encapsulate the deactivation events of the first and the second lines into one report message, and then reports a group of line events with one message.

It should be noted that it is assumed that the time delay is 5 minutes. Practically, those skilled in the art may set any time delay that is appropriate according to the practical requirements. The time delay may be more or less than 5 minutes, or even no time delay is set.

EMBODIMENT V

In the present embodiment, a method for processing information reporting, in which a report control policy of time delay is employed, is described. When detecting the event information, the REFE does not report the event information. Instead, the REFE buffers the event information, waits for the event information querying request initiated by the CFE, and respond the querying request of the CFE with the event information buffered. The event may include line activation, line deactivation, and line re-synchronization, etc. The control policy may be described as follows: when an event occurs, the event information is buffered. Hereinafter, the interaction processes between the report function entities are described, where the AN is an REFE, and the NAS is a CFE.

The event processing procedure of the REFE is as follows:

1. The AN detects a line topology change event, such as a DSL activation event or a DSL deactivation event.

2. The AN performs matching for the event and obtains the control policy, and buffers the event information according to control policy.

The event information reporting procedure is as follows:

1. The NAS sends a status querying request. The status querying request may be sent when the NAS detects that a subscriber accesses the network, or may be sent when the NAS receives a notification from the network management system. The request message may be based on an L2CM message, and may request the status event information of a group of lines.

2. When receiving the status querying request sent by the NAS, the AN obtains the event information that is buffered, and sends a response message to the status querying request. The response message may be based on the L2CM message, and may include the event information of a group of lines.

3. When receiving the response message to the status querying request, the NAS extracts parameters from the response message, and performs configuration of QoS, etc.

The event information reporting control with respect to the processes such as restart and recovery of the NAS device, restart and recovery of the AN, etc. is the same as that in the control examples described above. The difference is that when the AN knows such events, the reporting control policies corresponding to such events are employed for determining whether the corresponding status event information should be reported, or determining whether the report should be performed with a time delay.

EMBODIMENT VI

In the present embodiment, still a method for reporting event information with a time delay is described. The event includes line activation, line re-synchronization, line deactivation, etc. The control policy of the information report may be described as follows: "when the line topology change event occurs, if the line status has been held for a time T1, or if the change of the status of the event lasts for more than a time T2, the information report of the line status change is sent". The specific implementation of this control policy includes: setting the consecutive time of the event information that the status of the designated AN or AN partition or line of AN is stable or changed to be T1 or T2. In other words, if the status consecutive time after the subscriber line status change event reaches at least the designated time, the information report of the subscriber line status change event is sent; or if the time that the change of the subscriber line status (with respect to the last stable status) lasts reaches at least the designated time, the information report of the subscriber line status change event is sent. The main processes of the present embodiment are as follows:

1. The REFE detects a line topology change event, such as line activation, line re-synchronization or line deactivation. The REFE obtains the event information, including the ID of the line where the event occurs, the time when the event occurs and the time when the last stable status changes.

2. The REFE processes the reporting of the event information according to the control policy. When it is set that the reporting is performed with a time delay if the consecutive time of the status stable event information is T1, the REFE reports the event information when the line activation or deactivation event is detected and the activated status after line activation or the deactivated status after line deactivation maintains for at least a time length of T1. Specifically, the time delay may be implemented with a timer, such as starting the timer with a designated time (T1). The parameters of the timer include the event information (such as line ID and event type). If the timer expires, the event information report is sent. When it is set that the consecutive time of the status change event information is T2, and if the time from the last change of the stable status to the occurrence of the event (referred to as T3) exceeds T2, it is triggered to report the event information immediately. If T3 does not reach (is less than) T2, the delay continues and it is waited to perform reporting. The REFE may implement time delay with a timer, such as starting the timer with a designated time (T2-T3).

3. The REFE processes the reporting of the event information. For example, the REFE triggers reporting the event information immediately, or obtains the line topology change event information according to a timing out indication. The line topology change event information includes the line ID, bandwidth, status, etc. Then, the L2CM information report message is constituted according to the line topology change event information.

4. The REFE sends the event information report message. The REFE may obtain the corresponding L2CM connection according to the information report event information (such as line ID or address), and then send the L2CM information report message via the L2CM connection.

EMBODIMENT VII

The REFE may report all the status information to the CFE at a time, and then the REFE may select the report in which the status information is changed according to the actual control policy. In the present embodiment a method is described, in which the REFE reports all the status information to the CFE after the establishment of the control connection. The control policy enforcement parameters include a status information report initialization and sending mark configured on the designated AN or AN partition. The specific processes are as follows:

1. The REFE and the CFE negotiate and establish an L2CM control connection (or session). When detecting that the L2CM control connection (or session) is established, the REFE starts to send the status information report of the line or port corresponding to the L2CM control connection.

2. The REFE obtains the corresponding status information according to the L2CM control connection. Specifically, the REFE obtains the status information of all the lines or ports corresponding to the L2CM control connection, and encapsulates the status information into a L2CM information report message. In the REFE, there is generally a mapping table of the L2CM control connection and the line or port. The L2CM control connection may correspond to all the lines or ports of a device. Alternatively, the L2CM control connection may correspond to a line or port of a device or a partition. The lines or ports corresponding to the L2CM control connection include the subscriber access line or uplink port. The REFE may encapsulate the status information of a line or port into an L2CM information report message, or may encapsulate the status information of a plurality of lines or ports into an L2CM information report message. The REFE may obtain the status information of all the lines or ports according to the mapping table of the L2CM control connection and the line or port, and then encapsulate the status information into L2CM information report messages respectively. The status information of the line or port of the REFE may include the status and line ID, and may also include the bandwidth, line logic index, etc. The line logic index is the logic number of the line, and the line ID is generally the physical address of the line. For example, the line ID consists of device address, slot number and port. The line logic index may be preconfigured. There is a one-to-one correspondence between the line logic indexes and the line IDs.

3. The REFE sends the status information reports one by one. The REFE sends the L2CM information report message obtained through the encapsulation in Process 2. The REFE may send an L2CM information report message right after the constitution of this message in Process 2, or may send the L2CM information report messages uniformly when all the messages are constituted in Process 2.

After enforcement of the above operations, there may also be following operation processes with respect to the CFE:

4. When receiving the status information report sent by the REFE, the CFE obtains the status information from the status information report, buffers the status information or generates an access topology information database according to the status information for subsequent control processing. If the status information report sent by the REFE includes the line logic index, the CFE saves a mapping relation between the line logic index and the line ID. The CFE may perform control negotiation with the policy server according to the line logic index.

EMBODIMENT VIII

In the present embodiment, a method for controlling an enforcement feedback information reporting is described. The enforcement feedback information in the present embodiment is multicast accounting information. The multicast accounting information refers to the multicast group accessed by the subscriber and the time information or flow information. Because the frequent accesses to the multicast by a plurality of subscribers may generate large amount of accounting information, control should be performed on the multicast accounting information reporting. The policy for the control of the multicast accounting information reporting includes the control interval of the event information reporting with respect to the accounting time length, accounting information report interval or period, etc. The multicast accounting time is used for controlling the generation of accounting information, i.e., when the multicast accessing performed by the subscriber reaches a designated time, the REFE generates the multicast accounting information. If the multicast accessing performed by the subscriber does not reach the designated time, no multicast accounting information is generated. The accounting information sending interval or period refers to the interval or period with which the REFE sends the multicast accounting information report. The accounting time length, accounting information sending interval or period may be configured based on multicast channel or subscriber. The specific configuration may be as follows:

Configuration based on multicast channel:

| Multicast Channel | Accounting Time Length | Sending Interval or Period |
|---|---|---|
| 225.2.9.0 | 5 Min | 10 Min |
| ... | | |
| 239.2.9.0/20.0.0.1 | 10 Min | 20 Min |

Configuration based on subscriber or partition:

| Subscriber ID | Accounting Time Length | Sending Interval or Period |
|---|---|---|
| Port 1 | 5 Min | 10 Min |
| ... | | |
| Partition 1 | 10 Min | 20 Min |

The accounting time length, accounting information sending interval or period may be configured through L2CM or ANCP. The accounting time length, accounting information sending interval or period may not exist simultaneously.

Hereinafter, the processes of controlling the sending of multicast accounting information by employing the policy with respect to the accounting time length, accounting information sending interval or period is described in detail:

1. The REFE detects a service track change event such as multicast accounting event or access statistical event, and generates record information about enforcement of the service control (such as accounting record information). Specifically, the REFE generates the accounting record information according to the multicast member joining message and the multicast member leaving message of the subscriber that are received. The REFE generates accounting information according to the accounting time length. If the time length for which the subscriber accesses the multicast (i.e., the time duration from the time when the subscriber joins the multicast group with IGMP to the time when the subscriber leaves the multicast group with IGMP) satisfies the accounting time length, the REFE generates the accounting information; otherwise, the REFE does not generate the accounting information. After generation of the accounting information, the REFE gives an instruction to send the accounting information report. If no accounting time length policy is configured, the REFE generates the enforcement feedback information report such as accounting information according to the time when the subscriber accesses the multicast.

2. If the REFE has configured the accounting information sending interval or period, the REFE buffers the accounting record information, waits until the time of accounting information sending interval or period is reached, and then sends the buffered accounting record information, i.e., sends the enforcement feedback information report.

3. When the time of the interval or period is reached, the REFE obtains at least one accounting information that is buffered, encapsulates the accounting information into at least one L2CM information report message, and sends out the L2CM information report message that includes the multicast accounting information.

EMBODIMENT IX

In the present embodiment, a method for processing the event information reporting by employing the limit rate of the event is described. The control policy include a frequency parameter (or limit rate) of the event information reporting that is configured on a designated AN or AN partition or a line of AN, such as the frequency or limit rate for reporting of a multicast authorization request of a multicast joining request or an admission control request. The frequency configured on the line of AN for processing the reporting of the multicast authorization request of the multicast joining request or the admission control request is three per minute. Hereinafter, the procedure of processing the event information reporting by employing the control rate of the event information is described in detail:

The AN has configured the frequency for processing the multicast joining request in advance on Line 1.

1. The AN detects a service decision request event, and triggers a control decision information reporting. For example, the AN receives a multicast joining request on Line 1, such as an IGMP report message. The AN obtains the information parameters of the multicast joining request, such as multicast address and subscriber ID, where the subscriber ID includes line ID or subscriber IP address, etc.

2. According to the information parameters of the multicast joining request, the AN sends a control decision information report, such as a multicast authorization requesting report or admission control requesting report, to the CFE. For example, The AN searches for or performs matching for the control policy, and checks whether three message reports have been sent in the past time that is designated (such as three minutes). If three message reports have been sent, the multicast joining request message is discarded or buffered for sending after a time delay. If less than three message reports have been sent in the past time that is designated (three minutes), an L2CM information report message is constituted, and the processing time is recorded.

3. The AN sends the L2CM information report message, i.e., the control decision information report.

In one word, the sending rate or number of the message reports may be reduced via the control of the event information reporting frequency. The information reporting of any event can be processed with the policy of controlling the event information reporting frequency.

EMBODIMENT X

For an information report that is generated because of the event that is changed for a short time, a time threshold may be configured for implementing the reporting of the event information. The control policy of the present embodiment may be described as follows: "when a first event occurs, if the time interval between the occurrence of the first event and that of the second event does not reach the designated time, this event is ignored". The specific implementation of this control policy includes the status event control interval or the time threshold for event information reporting that is configured on the designated AN or AN partition or line of AN. For example, the time threshold for sending the line deactivation event is configured, or the control interval with which the line changes from the activated status into the deactivated status is configured. The AN sends the message report according to the time threshold. For example, with respect to the status information report, when Line 1 of the AN changes from the activated status into the deactivated status and then changes from the deactivated status into the activated status again within a designated period of time, if the time length from the occurrence of the deactivation to the occurrence of the activation does not reach the designated time (such as 30 seconds), the AN ignores the deactivation and activation event information reporting occurred on Line 1.

EMBODIMENT XI

With respect to the information reporting that is generated because of the event triggered by the CFE through performing control, a control policy may be defined to control the information reporting. This control policy may be described as follows: "when a first event occurs, if the cause for generation of the first event is generated by the CFE, this event is ignored". The specific implementation of this control policy includes the cause flag of the event information reporting configured on the designated AN or AN partition or line of AN, such as the flag of prohibiting the REFE from sending the status information report that is generated when the CFE configures the line or port of the REFE. For example, for a DSL, when the line is in the activated status, the CFE configures line parameters of the AN (such as interleaving depth and negotiation bandwidth) via an L2CM configuration message. When receiving the line configuration request of the CFE, the AN performs configuration of the line parameters, and performs a line status re-negotiation according to the configured line parameters, such as the re-negotiation of the interleaving depth or bandwidth. At this point, a re-synchronization event or activation event or deactivation event may occur on the line of AN. The sending of the report of such event information may be prohibited via a policy by the AN. Preferably, the AN may wait until the line negotiation is completed, obtain the negotiated line parameters, and then take the negotiated parameters as parameters of the configuration response message and return these parameters to the CFE.

Figure 9:
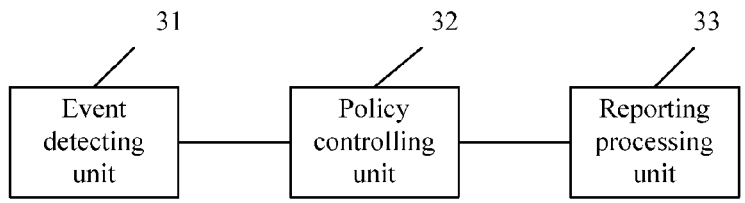
FIG. 9 is a schematic diagram showing the structure of a device that controls the information reporting according to the policy in an embodiment of the disclosure.

Please refer to FIG. 9, an information reporting device is further provided according to an embodiment of the disclosure. The information reporting device includes:

an event detecting unit 31, which is adapted to detect the information event; a policy controlling unit 32, which is adapted to obtain the corresponding control policy according to the event, and control a reporting processing unit to processes the information report according to the control policy; and a reporting processing unit 33, which is adapted to generate and send an information report. The event detecting unit 31 is connected with the policy controlling unit 32. When detecting the above event, the event detecting unit 31 submits event information to the policy controlling unit 32. When receiving the event information, the policy controlling unit 32 performs matching for the event with the control policy to determine how to perform processing on the event information report. After determining the processing mode for the event information report, the policy controlling unit 32 outputs the corresponding control information to the reporting processing unit 33 that is connected with the policy controlling unit 32 according to the control mode. The reporting processing unit 33 generates a corresponding information report message according to the event information, and sends the information report message.

Figure 10:
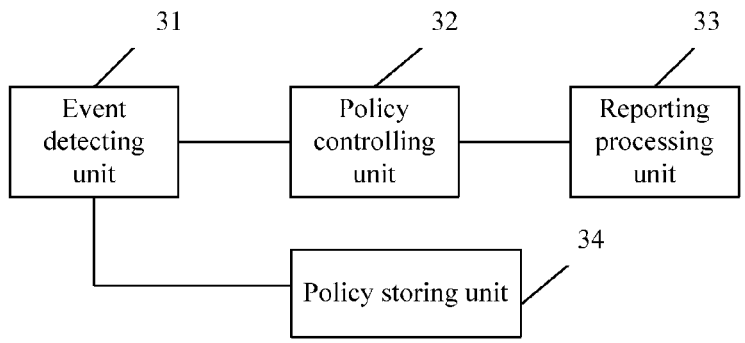
FIG. 10 is a schematic diagram showing the structure of a device that controls the information reporting according to the policy in another embodiment of the disclosure.

As shown in FIG. 10, based on the above device, a policy storing unit 34 that is integrated with or separated from the event detecting unit 31 may be configured. The policy storing unit 34 is adapted to receive the policy configuration and set the control policy enforcement parameters. When the policy storing unit 34 is separated from the event detecting unit 31, a wired mode or wireless mode is employed for the communication between the policy storing unit 34 and the policy controlling unit 32 to exchange the policy information. The above event information may be line parameter information, subscriber subscription parameter information, line ID information, time parameter information, etc.

Furthermore, an embodiment of the present disclosure provides a control device for information reporting. Actually, the control device for the event information reporting is obtained by setting the above control device in the existing REFE, such as AN or DSLAM. It should be noted that the above event detecting unit 31, policy controlling unit 32, reporting processing unit 33 and policy storing unit 34 may be integrated with or separated from the REFE The technical solutions provided by the present disclosure have been illustrated in detail above. The principles and embodiments of the disclosure have been described with specific examples, but the above embodiments are only used for better understanding of the method of the disclosure and its core concept. At the same time, various modifications may be made by those skilled in the art based on the idea of the present disclosure. Therefore, the disclosure is not limited to the contents of the description.

What is claimed is:

1. A method for processing information reporting, comprising:
    obtaining, by an access node (AN), event information when a re-synchronization event occurs on a line;
    comparing, by the AN, after line re-synchronization, a change of a line attribute of the line with a threshold, the threshold comprising a line bandwidth threshold, a line interleaving depth threshold, a line transfer time delay threshold or a line packet loss rate threshold; and
    processing, by the AN, a synchronization event information report for communicating the event information to a network access server (NAS) following the line re-synchronization, the processing including:
    if the change of the line attribute is smaller than the threshold, suppressing the synchronization event information report; and
    otherwise, sending the synchronization event information report in a port activation report message to the NAS.

2. The method according to claim 1, wherein the synchronization event information report comprises the line attribute after the line re-synchronization.

3. The method according to claim 1, wherein the NAS comprises a broadband network gateway (BNG), a broadband remote access server (BRAS) or an IP edge device.

4. The method according to claim 1, wherein the NAS comprises a broadband network gateway (BNG), a broadband remote access server (BRAS) or an IP edge device.

5. The method according to claim 1, wherein suppressing the synchronization event information report comprises not sending the synchronization event information report to the NAS.

6. The method according to claim 1, wherein processing the synchronization event information report comprises processing the synchronization event information report according to the comparison result.

7. The method according to claim 1, wherein the threshold comprises the line bandwidth threshold.

8. The method according to claim 1, wherein the threshold comprises the line interleaving depth threshold.

9. The method according to claim 1, wherein the threshold comprises the line transfer time delay threshold.

10. The method according to claim 1, wherein the threshold comprises the line packet loss rate threshold.

11. An access node (AN), comprising:
    at least one processor configured to:
    obtaining event information when a re-synchronization event occurs on a line;
    comparing, after line re-synchronization, a change of a line attribute of the line with a threshold, the threshold comprising a line bandwidth threshold, a line interleaving depth threshold, a line transfer time delay threshold or a line packet loss rate threshold; and
    processing a synchronization event information report for communicating the event information to a network access server (NAS) following the line re-synchronization, the processing including:
    if the change of the line attribute is smaller than the threshold, suppressing the synchronization event information report; and
    otherwise, sending the synchronization event information report in a port activation report message to the NAS.

12. The AN according to claim 11, wherein the synchronization event information report comprises the line attribute after the line re-synchronization.

13. The AN according to claim 11, wherein suppressing the synchronization event information report comprises not sending the synchronization event information report to the NAS.

14. The AN according to claim 11, wherein processing the synchronization event information report comprises processing the synchronization event information report according to the comparison result.

15. The AN according to claim 11, wherein the threshold comprises the line bandwidth threshold.

16. The AN according to claim 11, wherein the threshold comprises the line interleaving depth threshold.

17. The AN according to claim 11, wherein the threshold comprises the line transfer time delay threshold.

18. The AN according to claim 11, wherein the threshold comprises the line packet loss rate threshold.

19. An access node (AN), comprising:
a processor; and
a computer readable storage medium storing programming for execution by the processor, the programming including instructions to:
determine that a line re-synchronization has occurred on a line;
determine a change of a line attribute corresponding to the line re-synchronization; and
processing a synchronization event report for notifying a network access server (NAS) of the line re-synchronization, wherein the instructions to process the synchronization event report include an instruction to suppress the synchronization event report if the change of the line attribute is smaller than a threshold.

20. The AN according to claim 1, wherein the instructions to process the synchronization event report further include instructions to forward the synchronization event report to the NAS if the change of the line attribute exceeds the threshold, and
wherein the threshold comprises a line bandwidth threshold, a line interleaving depth threshold, a line transfer time delay threshold, or a line packet loss rate threshold.

* * * * *